United States Patent [19]

Clarizo

[11] Patent Number: 4,572,107
[45] Date of Patent: Feb. 25, 1986

[54] EASILY CLEANABLE ANIMAL ENCLOSURE

[76] Inventor: Vito Clarizo, 25-34 College Point Blvd., College Point, N.Y. 11354

[21] Appl. No.: 665,705

[22] Filed: Oct. 29, 1984

[51] Int. Cl.$^4$ ............................................. A01K 31/06
[52] U.S. Cl. ....................................................... 119/17
[58] Field of Search .................................. 119/1, 17, 22

[56] References Cited

U.S. PATENT DOCUMENTS

| | | | |
|---|---|---|---|
| 2,144,329 | 1/1939 | Conlon et al. | 119/1 |
| 3,098,465 | 7/1963 | Ivey | 119/17 X |
| 3,107,650 | 10/1963 | Cass | 119/17 |
| 3,429,297 | 2/1969 | Schroer | 119/17 |
| 4,027,625 | 6/1977 | Wheeler | 119/1 |

Primary Examiner—Robert P. Swiatek
Attorney, Agent, or Firm—Michael I. Kroll

[57] ABSTRACT

An easily cleanable animal enclosure is provided and consists of a cage detachably positioned over a funnel supported by a base member. Newspaper is placed within the funnel to absorb excreted matter that is discharged from the cage and a detachable sack that has an inner bag is placed at bottom open end of the funnel to catch any excreted matter that falls through.

4 Claims, 4 Drawing Figures

EASILY CLEANABLE ANIMAL ENCLOSURE

BACKGROUND OF THE INVENTION

1. Field of Invention

The instant invention relates generally to cages and more specifically it relates to an easily cleanable animal enclosure.

2. Description of the Prior Art

Numerous cages have been provided in prior art that are adapted to house various forms of life. For example, U.S. Pat. Nos. 2,316,263; 2,524,229; 2,684,051; 3,107,650; 4,154,196 and 4,210,100 all are illustrative of such prior art. While these units may be suitable for the particular purpose to which they address, they would not be suitable for the purposes of the present invention as heretofore described.

SUMMARY OF THE INVENTION

The invention will eliminate the mess that occurs on the outside area of a standard type bird cage. The caged birds diet is mainly shelled seeds and nuts. The shells are discarded and will accumulate on the bottom pan of the standard type bird cage. These shells are blown outside the cage when the bird flaps its wings. Daily the pet owner must clean the area outside the cage because the mess is unsanitary and unpleasant to the eye. The invention will eliminate the mess because there will be no accumulation of shells. Rather the discarded shells fall through a funnel and into a sack having an inner bag far below the cage so as not to be blown by the birds flapping wings.

A principle object of the present invention is to provide an easily cleanable animal enclosure that is a cage detachably positioned over a funnel supported by a base member having a door.

Another object is to provide an easily cleanable animal enclosure that utilizes four pieces of newspaper placed within the funnel to absorb excreted matter that is discharged from the cage.

An additional object is to provide an easily cleanable animal enclosure that contains a detachable sack having an inner bag placed at bottom open end of the funnel to catch the excreted matter, discarded shells and other discarded material, that fall through.

A further object is to provide an easily cleanable animal enclosure that is simple and easy to use.

A still further object is to provide an easily cleanable animal enclosure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figures 1, 2, 3:
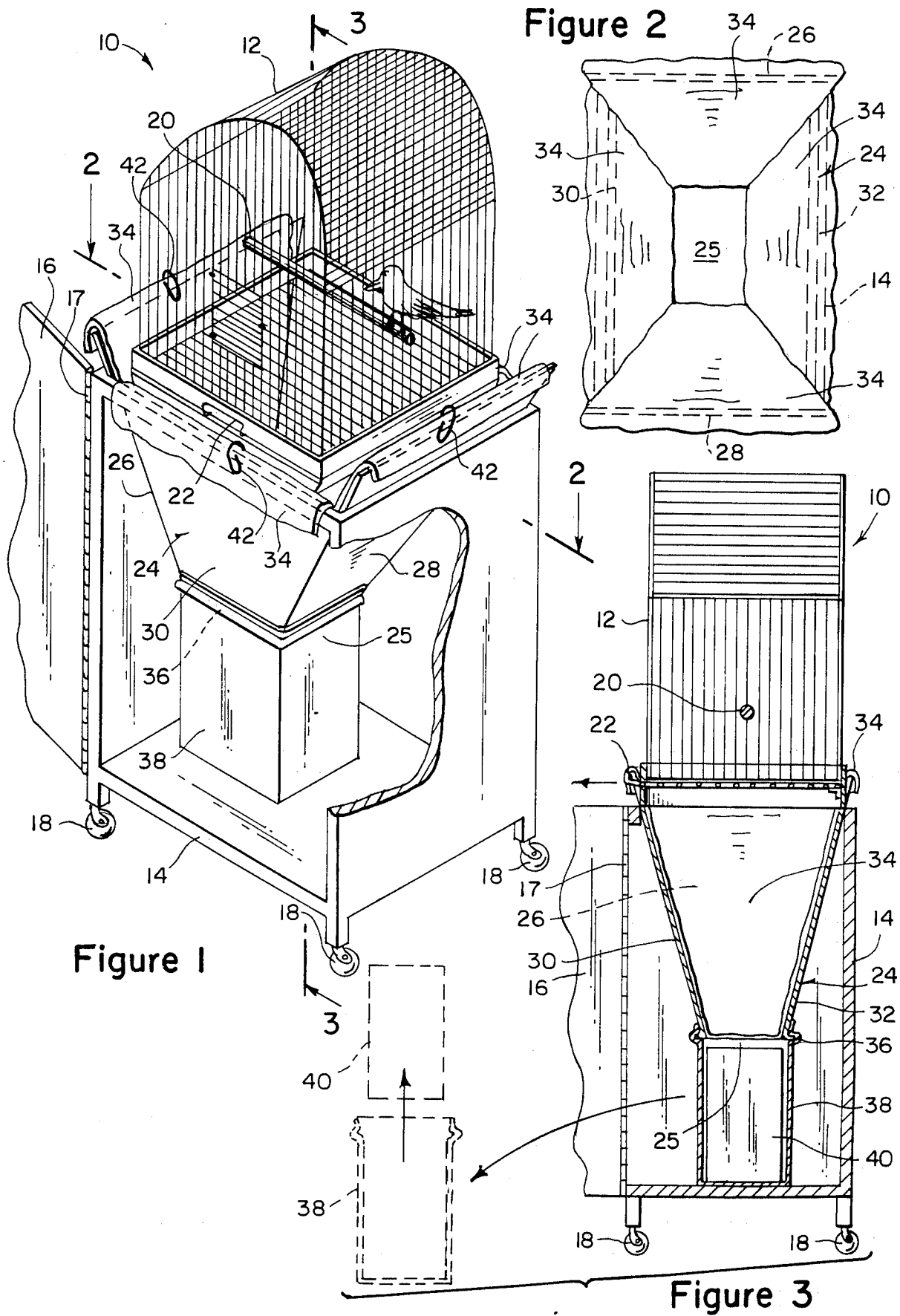
FIG. 1 is a perspective view of the invention with parts broken away.
FIG. 2 is a top view taken along line 2—2 in FIG. 1.
FIG. 3 is a vertical cross sectional view taken along line 3—3 in FIG. 1.
Figure 4:
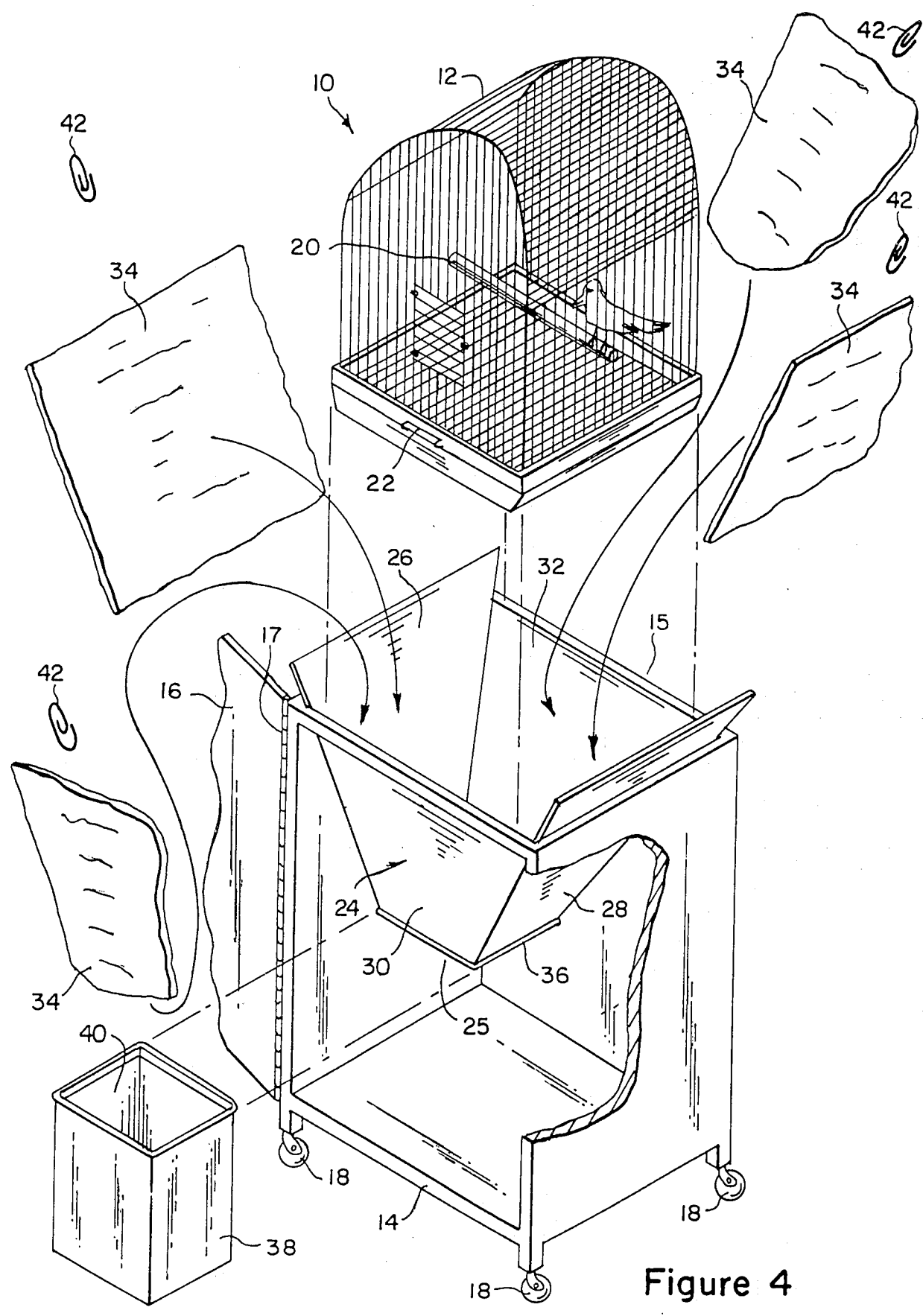
FIG. 4 is an exploded perspective view of the invention with parts broken away.

Turning now descriptively to the drawings, in which similar reference characters denote similar elements throughout the several views, FIGS. 1 through 4 illustrate an easily cleanable animal enclosure 10 that consists of a cage 12, a funnel 24 and a box-like base member 14.

The cage 12 has a horizontal animal-supporting mesh floor 22 for passage of excreted matter therethrough. The funnel 24 is below the cage 12 for receiving the excreted matter passing through the mesh floor 22 of the cage 12. The funnel 24 has a discharge opening 25 at its lower end. The box-like base member 14 has an open top 15 for supporting the funnel 24 with the cage 12 being removable from the funnel.

The cage 12 is of the standard type and has a perch 20 for an animal, such as a bird to sit on. The mesh floor 22 is a removable grill with a handle so that the grill can be removed and cleaned.

A lip 36 is placed around the discharge opening 25 of the funnel 24 and sack 38 is detachable from the lip 36 of the funnel. A disposable inner bag 40 is removable from and replaceable within the sack 38 to catch any excreted matter that falls through the funnel 24.

The base member 14 further contains a door 16 hinged at one side 17 for quick access within to reach the sack 38 and the inner bag 40. A plurality of wheels 18 is mounted to underside of the base member 14 making the animal enclosure 10 portable. In the drawing four wheels 18 are provided at each corner of the base member.

The funnel 24 is formed as a right rectangular pyramid-shaped dropping pan having four walls 26, 28, 30 and 32. Four pieces of newspaper 34 and four clips 42 are also provided. Each piece of newspaper 34 is placed within the dropping pan 24 to cover one of the four walls 26, 28, 30 and 32. Each clip 42 is placed over a folded end of each piece of newspaper 34 to hold the folded end securely thereto.

The cage 12 and mesh floor 22 are fabricated from metal materials. The base member 14 and funnel 24 can be fabricated from metal, wood, plastic or any other durable material. The inner bag 40 and sack 38 can be fabricated from paper, cloth or soft plastic material.

To clean the animal enclosure 10 the following steps are taken:

1. Remove the cage 12 from the funnel 24.

2. Pull out the removable grill 22 by its handle and clean it.

3. Remove the clips 42 and the newspaper 34 from the funnel 24. Replace with clean pieces of newspaper.

4. Open the door 16 of the base member 14 and remove the sack 38 and inner bag 40. Replace them with clean ones.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An easily cleanable animal enclosure which comprises:

(a) a cage having a horizontal animal-supporting mesh floor for passage of excreted matter therethrough;
(b) a funnel below said cage for receiving said excreted matter passing through said mesh floor of said cage, said funnel have a discharge opening at its lower end;
(c) a box-like base member having an open top for supporting said funnel, said cage being removable from said funnel;
(d) a perch for animal to sit on;
(e) said mesh floor being a removable grill with handle so that said grill can be removed and cleaned.
(f) a lip placed around said discharge opening of said funnel;
(g) a sack detachable from said lip of said funnel; and
(h) a disposable inner bag removable from and replaceable within said sack to catch any excreted matter that falls through said funnel.

2. An easily cleanable animal enclosure as recited in claim 1, wherein said base member further comprises:
(a) a hinged door at one side for quick access within to reach said sack and said inner bag; and
(b) a plurality of wheels mounted to underside of said base member making said animal enclosure portable.

3. An easily cleanable animal enclosure as recited in claim 1, wherein said funnel is formed as a right rectangular pyramid-shaped dropping pan having four walls.

4. An easily cleanable animal enclosure as recited in claim 3, further comprises:
(a) four pieces of newspaper, each said piece of newspaper placed within said dropping pan to cover one of said four walls; and
(b) four clips, each said clip placed over a folded end of each said piece of newspaper to hold said folded end securely thereto.

* * * * *